(12) United States Patent
Ogawa et al.

(10) Patent No.: US 8,830,940 B2
(45) Date of Patent: Sep. 9, 2014

(54) WIRELESS COMMUNICATION APPARATUS AND WIRELESS COMMUNICATION METHOD

(75) Inventors: Yoshihiko Ogawa, Kanagawa (JP); Akihiko Nishio, Kanagawa (JP); Daichi Imamura, Kanagawa (JP); Seigo Nakao, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 253 days.

(21) Appl. No.: 13/517,103

(22) PCT Filed: Jan. 7, 2011

(86) PCT No.: PCT/JP2011/000044
§ 371 (c)(1),
(2), (4) Date: Jun. 19, 2012

(87) PCT Pub. No.: WO2011/083770
PCT Pub. Date: Jul. 14, 2011

(65) Prior Publication Data
US 2012/0263131 A1    Oct. 18, 2012

(30) Foreign Application Priority Data
Jan. 8, 2010   (JP) ................. 2010-003153

(51) Int. Cl.
*H04W 72/04*   (2009.01)
*H04L 5/00*    (2006.01)
*H04W 88/02*   (2009.01)

(52) U.S. Cl.
CPC ............. *H04W 72/04* (2013.01); *H04W 88/02* (2013.01); *H04L 5/0041* (2013.01); *H04L 5/0094* (2013.01); *H04L 5/0007* (2013.01)
USPC ........................................ 370/329

(58) Field of Classification Search
CPC .............................. H04W 72/04; H04W 88/02
USPC ........................................ 370/329; 455/450
See application file for complete search history.

(56) References Cited

U.S. PATENT DOCUMENTS

2011/0116428 A1*  5/2011 Seong et al. .................. 370/311
2012/0113912 A1   5/2012 Ogawa et al.

FOREIGN PATENT DOCUMENTS

CN        101578816 A    11/2009
JP        2010-516187 A   5/2010

(Continued)

OTHER PUBLICATIONS

TS36.211 v8.5.0 3GPP TSG RAN; Evolved Universal Terrestrial Radio Access(E-UTRA); Physical Channel and Modulation; Dec. 2008.
R1-094741, ZTE, Uplink Non-contiguous Resource Allocation for LTE-Advanced, 3GPP TSG RAN WG1 Meeting #59, Jeju, Korea, Nov. 9-13, 2009.

(Continued)

*Primary Examiner* — Paul H Masur
(74) *Attorney, Agent, or Firm* — Pearne & Gordon LLP

(57) ABSTRACT

There are disclosed a wireless communication apparatus and a wireless communication method whereby a flexible frequency scheduling can be performed without increasing the circuit scale of DFT (Discrete Fourier Transform). In a terminal (200), a number-of-allocated-RBs setting unit (209) sets a number of allocated RBs, which is to be used for an actual transmission band corresponding to the number of notified RBs, to a number of resource blocks that can be expressed by one of "$2^n \times 3^m \times 5^l$". The allocated RB selecting unit (210) selects, based on the resource allocation information and the number of allocated RBs, either an unused one of the notified RBs that is not used as the transmission band or an additional RB that is added to the notified RBs and used as the transmission band.

14 Claims, 15 Drawing Sheets

(56) References Cited

FOREIGN PATENT DOCUMENTS

| WO | 2008085959 | A1 | 7/2008 |
|---|---|---|---|
| WO | 2010106783 | A1 | 9/2010 |

OTHER PUBLICATIONS

R1-094986, ASUSTeK, Non-contiguous uplink resource allocation for LTE-A, 3GPP TSG RAN WG1 Meeting #59, Jeju, Korea, Nov. 9-13, 2009.

R1-094573, Samsung "Control Signaling for Non-Contiguous UL Resource Allocations", 3GPP TSG RAN WG1 Meeting #59.

International Search Report for PCT/JP2011/000044 dated Feb. 15, 2011.

TS36.211 v9.0,0 3GPP TS; Evolved Universal Terrestrial Radio Access(E-UTRA); Physical Channel and Modulation (Release 9), Dec. 2009 passage 5.3.3.

MediaTek Inc., Discussion on Non-contiguous PUSCH Resource Allocation, 3GPP TSG RAN WG1 #60bis, R1-101986, Apr. 16, 2010.

* cited by examiner

| NUMBER OF REPORTED RBs | |
|---|---|
| 4 | O |
| 8 | O |
| 12 | O |
| 16 | O |
| 20 | O |
| 24 | O |
| 28 | × |
| 32 | O |
| 36 | O |
| 40 | O |
| 44 | × |
| 48 | O |
| 52 | × |
| 56 | × |
| 60 | O |
| 64 | O |
| 68 | × |
| 72 | O |
| 76 | × |
| 80 | O |
| 84 | × |
| 88 | × |
| 92 | × |
| 96 | O |
| 100 | O |
| 104 | × |
| 108 | O |
| 112 | × |
| 116 | × |
| 120 | O |

FIG.3

| NUMBER OF REPORTED RBs | | NUMBER OF ALLOCATED RBs |
|---|---|---|
| 4 | | 4 |
| 8 | | 8 |
| 12 | | 12 |
| 16 | | 16 |
| 20 | | 20 |
| 24 | | 24 |
| 28 | → | 27 |
| 32 | | 32 |
| 36 | | 36 |
| 40 | | 40 |
| 44 | → | 45 |
| 48 | | 48 |
| 52 | → | 50 |
| 56 | → | 54 |
| 60 | | 60 |
| 64 | | 64 |
| 68 | → | 72 |
| 72 | | 72 |
| 76 | → | 75 |
| 80 | | 80 |
| 84 | → | 81 |
| 88 | → | 90 |
| 92 | → | 90 |
| 96 | | 96 |
| 100 | | 100 |
| 104 | → | 108 |
| 108 | | 108 |
| 112 | → | 114 |
| 116 | → | 114 |
| 120 | | 120 |

FIG.6

| NUMBER OF REPORTED RBs | | NUMBER OF ALLOCATED RBs |
|---|---|---|
| 4 | | 4 |
| 8 | | 8 |
| 12 | | 12 |
| 16 | | 16 |
| 20 | | 20 |
| 24 | | 24 |
| 28 | → | 30 |
| 32 | | 32 |
| 36 | | 36 |
| 40 | | 40 |
| 44 | → | 45 |
| 48 | | 48 |
| 52 | → | 54 |
| 56 | → | 60 |
| 60 | | 60 |
| 64 | | 64 |
| 68 | → | 72 |
| 72 | | 72 |
| 76 | → | 80 |
| 80 | | 80 |
| 84 | → | 90 |
| 88 | → | 90 |
| 92 | → | 96 |
| 96 | | 96 |
| 100 | | 100 |
| 104 | → | 108 |
| 108 | | 108 |
| 112 | → | 114 |
| 116 | → | 120 |
| 120 | | 120 |

FIG.7

| NUMBER OF REPORTED RBs | | NUMBER OF ALLOCATED RBs |
|---|---|---|
| 4 | | 4 |
| 8 | | 8 |
| 12 | | 12 |
| 16 | | 16 |
| 20 | | 20 |
| 24 | | 24 |
| 28 | → | 27 |
| 32 | | 32 |
| 36 | | 36 |
| 40 | | 40 |
| 44 | → | 40 |
| 48 | | 48 |
| 52 | → | 50 |
| 56 | → | 54 |
| 60 | | 60 |
| 64 | | 64 |
| 68 | → | 64 |
| 72 | | 72 |
| 76 | → | 75 |
| 80 | | 80 |
| 84 | → | 81 |
| 88 | → | 81 |
| 92 | → | 90 |
| 96 | | 96 |
| 100 | | 100 |
| 104 | → | 100 |
| 108 | | 108 |
| 112 | → | 108 |
| 116 | → | 114 |
| 120 | | 120 |

FIG.8

| NUMBER OF REPORTED RBs | | NUMBER OF ALLOCATED RBs |
|---|---|---|
| 4 | | 4 |
| 8 | | 8 |
| 12 | | 12 |
| 16 | | 16 |
| 20 | | 20 |
| 24 | | 24 |
| 28 | → | 30 |
| 32 | | 32 |
| 36 | | 36 |
| 40 | | 40 |
| 44 | → | 45 |
| 48 | | 48 |
| 52 | → | 50 |
| 56 | → | 54 |
| 60 | | 60 |
| 64 | | 64 |
| 68 | → | 72 |
| 72 | | 72 |
| 76 | → | 75 |
| 80 | | 80 |
| 84 | → | 81 |
| 88 | → | 90 |
| 92 | → | 96 |
| 96 | | 96 |
| 100 | | 100 |
| 104 | → | 108 |
| 108 | | 108 |
| 112 | → | 114 |
| 116 | → | 120 |
| 120 | | 120 |

FIG.9

| NUMBER OF REPORTED RBs | | NUMBER OF ALLOCATED RBs (NUMBER OF ALLOCATED RBs BEFORE CONDITION ADDITION: [CORRESPONDENCE EXAMPLE #1-3]) | NUMBER OF UNUSED RBs (NUMBER OF UNUSED RBs BEFORE CONDITION ADDITION: [CORRESPONDENCE EXAMPLE #1-3]) |
|---|---|---|---|
| 4 | | 4 | 0 |
| 8 | | 8 | 0 |
| 12 | | 12 | 0 |
| 16 | | 16 | 0 |
| 20 | | 20 | 0 |
| 24 | | 24 | 0 |
| 28 | → | 27 | 1 |
| 32 | | 32 | 0 |
| 36 | | 36 | 0 |
| 40 | | 40 | 0 |
| 44 | → | 40 | -4 |
| 48 | | 48 | 0 |
| 52 | → | 48 (←50) | -4 (←-6) |
| 56 | → | 48 (←54) | -8 (←-2) |
| 60 | | 60 | 0 |
| 64 | | 64 | 0 |
| 68 | → | 64 | -4 |
| 72 | | 72 | 0 |
| 76 | → | 75 | -1 |
| 80 | | 80 | 0 |
| 84 | → | 81 | -3 |
| 88 | → | 81 | -7 |
| 92 | → | 81 | -11 |
| 96 | | 96 | 0 |
| 100 | | 100 | 0 |
| 104 | → | 100 | -4 |
| 108 | | 108 | 0 |
| 112 | → | 108 | -4 |
| 116 | → | 108 (←114) | -8 (←-2) |
| 120 | | 120 | 0 |

FIG.10

| NUMBER OF REPORTED RBs | | NUMBER OF ALLOCATED RBs (NUMBER OF ALLOCATED RBs BEFORE CONDITION ADDITION: [CORRESPONDENCE EXAMPLE #1-2]) | NUMBER OF UNUSED RBs (NUMBER OF UNUSED RBs BEFORE CONDITION ADDITION: [CORRESPONDENCE EXAMPLE #1-2]) |
|---|---|---|---|
| 4 | | 4 | 0 |
| 8 | | 8 | 0 |
| 12 | | 12 | 0 |
| 16 | | 16 | 0 |
| 20 | | 20 | 0 |
| 24 | | 24 | 0 |
| 28 | → | 32(←30) | (+4←+2) |
| 32 | | 32 | 0 |
| 36 | | 36 | 0 |
| 40 | | 40 | 0 |
| 44 | → | 45 | +1 |
| 48 | | 48 | 0 |
| 52 | → | 60(←54) | (+8←+2) |
| 56 | → | 60 | +4 |
| 60 | | 60 | 0 |
| 64 | | 64 | 0 |
| 68 | → | 72 | +4 |
| 72 | | 72 | 0 |
| 76 | → | 80 | +4 |
| 80 | | 80 | 0 |
| 84 | → | 96(←90) | (+12←+6) |
| 88 | → | 96(←90) | (+8←+2) |
| 92 | → | 96 | +4 |
| 96 | | 96 | 0 |
| 100 | | 100 | 0 |
| 104 | → | 108 | +4 |
| 108 | | 108 | 0 |
| 112 | → | 120(←114) | (+8←+2) |
| 116 | → | 120 | +4 |
| 120 | | 120 | 0 |

FIG.11

| NUMBER OF REPORTED RBs | | NUMBER OF ALLOCATED RBs (NUMBER OF ALLOCATED RBs BEFORE CONDITION ADDITION: [CORRESPONDENCE EXAMPLE #1-1]) | NUMBER OF UNUSED RBs (NUMBER OF UNUSED RBs BEFORE CONDITION ADDITION: [CORRESPONDENCE EXAMPLE #1-1]) |
|---|---|---|---|
| 4 | | 4 | 0 |
| 8 | | 8 | 0 |
| 12 | | 12 | 0 |
| 16 | | 16 | 0 |
| 20 | | 20 | 0 |
| 24 | | 24 | 0 |
| 28 | → | 27 | +1 |
| 32 | | 32 | 0 |
| 36 | | 36 | 0 |
| 40 | | 40 | 0 |
| 44 | → | 45 | +1 |
| 48 | | 48 | 0 |
| 52 | → | 48(←50) | −4(←−2) |
| 56 | → | 60(←54) | +4(←−2) |
| 60 | | 60 | 0 |
| 64 | | 64 | 0 |
| 68 | → | 72 | +4 |
| 72 | | 72 | 0 |
| 76 | → | 75 | −1 |
| 80 | | 80 | 0 |
| 84 | → | 81 | −3 |
| 88 | → | 96(←90) | +8(←+2) |
| 92 | → | 96(←90) | +4(←−2) |
| 96 | | 96 | 0 |
| 100 | | 100 | 0 |
| 104 | → | 108 | +4 |
| 108 | | 108 | 0 |
| 112 | → | 108(←114) | −4(←+2) |
| 116 | → | 120(←114) | +4(←−2) |
| 120 | | 120 | 0 |

FIG.12

WIRELESS COMMUNICATION APPARATUS AND WIRELESS COMMUNICATION METHOD

This application claims the benefit of Japanese Patent Application No. 2010-003153, filed on Jan. 8, 2010, including the specification, drawings and abstract, is incorporated herein by reference in its entirety.

TECHNICAL FIELD

The present invention relates to a wireless communication apparatus and a wireless communication method for a wireless communication system that allocates a data signal to a non-contiguous band.

BACKGROUND ART

In 3rd Generation Partnership Project Long Term Evolution (3GPP LTE) uplinks, only contiguous band allocation of a data signal is supported. Further, in LTE uplinks, in order to reduce the scale of a discrete Fourier transform (DFT) circuit, the number of allocatable resource blocks (RBs) is limited to only the number of RBs that can be expressed by "$2^n \times 3^m \times 5^l$" (n, m, and l are an integer equal to or more than 0) (see NPL 1).

Meanwhile, in LTE-Advanced (LTE-A) uplinks, in order to enhance a frequency scheduling effect, the support of non-contiguous band allocation of a data signal is studied (see FIG. 1). Further, in order to reduce an amount of allocation report during non-contiguous band allocation, type-2 allocation is studied. In the type-2 allocation, P contiguous resource blocks (RBs) are defined as one resource block group (RB group or RBG), and resource is allocated on a RBG basis.

A method of reporting a resource indicator value (RIV) indicating the first RB in a transmission band and a transmission bandwidth is used as the allocation reporting method for contiguous band allocation in an LTE uplink. Meanwhile, a method of reporting a plurality of RIVs is studied as one of the allocation reporting methods for non-contiguous hand allocation in an LTE-A uplink (NPL 2 to NPL 4). For example, in the case where two contiguous bands (hereinafter, referred to as "clusters") are allocated in a non-contiguous manner, the allocations of the two contiguous bands are respectively reported using two RIVs. At this time, in order to reduce an amount of allocation report, RBG-based resource allocation is studied (see FIG. 2). Note that an RBG size (P) is different for each system bandwidth (see Table 1).

TABLE 1

| System BW(RB) | RBG size(P) |
|---|---|
| <=10 | 1 |
| 11-26 | 2 |
| 27-63 | 3 |
| 64-110 | 4 |

CITATION LIST

Non-Patent Literature

NPL 1
TS36.211 v8.5.0"3GPP TSG RAN; Evolved Universal Terrestrial Radio Access (E-UTRA); Physical Channel and Modulation NPL 2
R1-094741, ZTE, Uplink Non-contiguous Resource Allocation for LTE-Advanced, 3GPP TSG RAN WG1 Meeting #59
NPL 3
R1-094986, ASUSTeK, Non-contiguous uplink resource allocation for LTE-A, 3GPP TSG RAN WG1 Meeting #59
NPL 4
R1-094573, Samsung "Control Signaling for Non-Contiguous UL Resource Allocations", 3GPP TSG RAN WG1 Meeting #59

SUMMARY OF INVENTION

Technical Problem

Unfortunately, in the case where resource is allocated on an RBG basis, the number of RBs allocated to a terminal apparatus (hereinafter, abbreviated as "terminal") is limited to the numbers of RBs that are multiples of P (RB). Further, similarly to the LTE uplinks, also in the LTE-A uplinks, if only the number of RBs that can be expressed by "$2^n \times 3^m \times 5^l$" is defined to be applicable to the number of RBs that can be allocated to a transmission band, the number of RBs that cannot be expressed by "$2^n \times 3^m \times 5^l$" is the number of RBs that cannot practically be allocated to the transmission band.

FIG. 3 shows an example in which the RBG size P is 4. Of the multiples of P (RB) shown in FIG. 3, the number of RBs with a circle corresponds to the number of RBs that can be expressed by "$2^n \times 3^m \times 5^l$", and the number of RBs with a cross corresponds to the number of RBs that cannot be expressed by "$2^n \times 3^m \times 5^l$". In this way, if the number of RBs that cannot be expressed by "$2^n \times 3^m \times 5^l$" is defined as the number of RBs that cannot practically be allocated to the transmission band, the number of RBs that cannot be allocated is unfavorably large, and flexible resource allocation is thus difficult, resulting in a decrease in frequency scheduling effect.

On the other hand, if the number of RBs that cannot be expressed by "$2^n \times 3^m \times 5^l$" is defined as the number of allocatable RBs, the circuit scale of the DFT circuit unfavorably increases.

The present invention has an object to provide a wireless communication apparatus and a wireless communication method that are capable of flexible frequency scheduling without an increase in DFT circuit scale.

Solution to Problem

A wireless communication apparatus of the present invention includes: a receiver configured to receive resource allocation information indicating a group to which resource is allocated, out of a plurality of groups that are obtained by dividing a system band based on a unit of a determined number of resource blocks; a setting section configured to set, in a case where a number of reported resource blocks reported by the resource allocation information cannot be expressed by "$2^n \times 3^m \times 5^l$" (n, m, and l are an integer equal to or more than 0), a number of allocated resource blocks that is used for an actual transmission band and corresponds to the number of reported resource blocks, to a number of resource blocks that can be expressed by any of "$2^n \times 3^m \times 5^l$"; and a selector configured to select an unused resource block that is not used for the transmission band in the reported resource blocks, or select an added resource block that is added to the reported resource blocks and is used for the transmission band, on a basis of the resource allocation information and the number of allocated resource blocks.

A wireless communication apparatus of the present invention includes: a scheduler configured to: set a number of allocated resource blocks allocated to an actual transmission band, to a number of resource blocks that can be expressed by any of "$2^n \times 3^m \times 5^l$" (n, m, and l are an integer equal to or more than 0); generate, as resource allocation information, group information corresponding to a resource to which the actual transmission band is allocated, out of a plurality of groups that are obtained by dividing a system band based on a unit of a determined number of resource blocks; select an unused resource block that is not used for the transmission band in reported resource blocks, or select an added resource block that is added to the reported resource blocks and is used for the transmission band, on a basis of the resource allocation information and the number of allocated resource blocks; and a transmitter configured to transmit the resource allocation information.

A wireless communication method of the present invention includes: receiving resource allocation information indicating a group to which resource is allocated, out of a plurality of groups that are obtained by dividing a system band based on a unit of a determined number of resource blocks; setting, in a case where a number of reported resource blocks reported by the resource allocation information cannot be expressed by "$2^n \times 3^m \times 5^l$" (n, m, and l are an integer equal to or more than 0), a number of allocated resource blocks that is used for an actual transmission band and corresponds to the number of reported resource blocks, to a number of resource blocks that can be expressed by any of "$2^n \times 3^m \times 5^l$"; and selecting an unused resource block that is not used for the transmission band in the reported resource blocks, or selecting an added resource block that is added to the reported resource blocks and is used for the transmission band, on a basis of the resource allocation information and the number of allocated resource blocks.

A wireless communication method of the present invention includes: setting a number of allocated resource blocks allocated to an actual transmission band, as a number of resource blocks that can be expressed by any of "$2^n \times 3^m \times 5^l$" (n, m, and l are an integer equal to or more than 0); generating, as resource allocation information, group information corresponding to a resource to which the actual transmission band is allocated, out of a plurality of groups that are obtained by dividing a system band based on a unit of a determined number of resource blocks; selecting an unused resource block that is not used for the transmission band in reported resource blocks, or selecting an added resource block that is added to the reported resource blocks and is used for the transmission band, on a basis of the resource allocation information and the number of allocated resource blocks; and transmitting the resource allocation information.

Advantageous Effects of Invention

According to the present invention, flexible frequency scheduling is possible without an increase in DFT circuit scale.

BRIEF DESCRIPTION OF DRAWINGS

FIG. 3 is a diagram for describing the number of non-allocatable RBs in the case of using a DPT circuit;

FIG. 6 is a diagram showing [Correspondence Example #1-1] between the number of reported RBs and the number of allocated RBs;

FIG. 7 is a diagram showing [Correspondence Example #1-2] between the number of reported RBs and the number of allocated RBs;

FIG. 8 is a diagram showing [Correspondence Example #1-3] between the number of reported RBs and the number of allocated RBs;

FIG. 9 is a diagram showing [Correspondence Example #1-4] between the number of reported RBs and the number of allocated RBs;

FIG. 10 is a diagram showing an example of [Correspondence Example #1-5] between the number of reported RBs and the number of allocated RBs;

FIG. 11 is a diagram showing another example of [Correspondence Example #1-5] between the number of reported RBs and the number of allocated RBs;

FIG. 12 is a diagram showing still another example of [Correspondence Example #1-5] between the number of reported RBs and the number of allocated RBs;

DESCRIPTION OF EMBODIMENTS

Now, an embodiment of the present invention will be described in detail with reference to the accompanying drawings.

Embodiment

Figure 1:
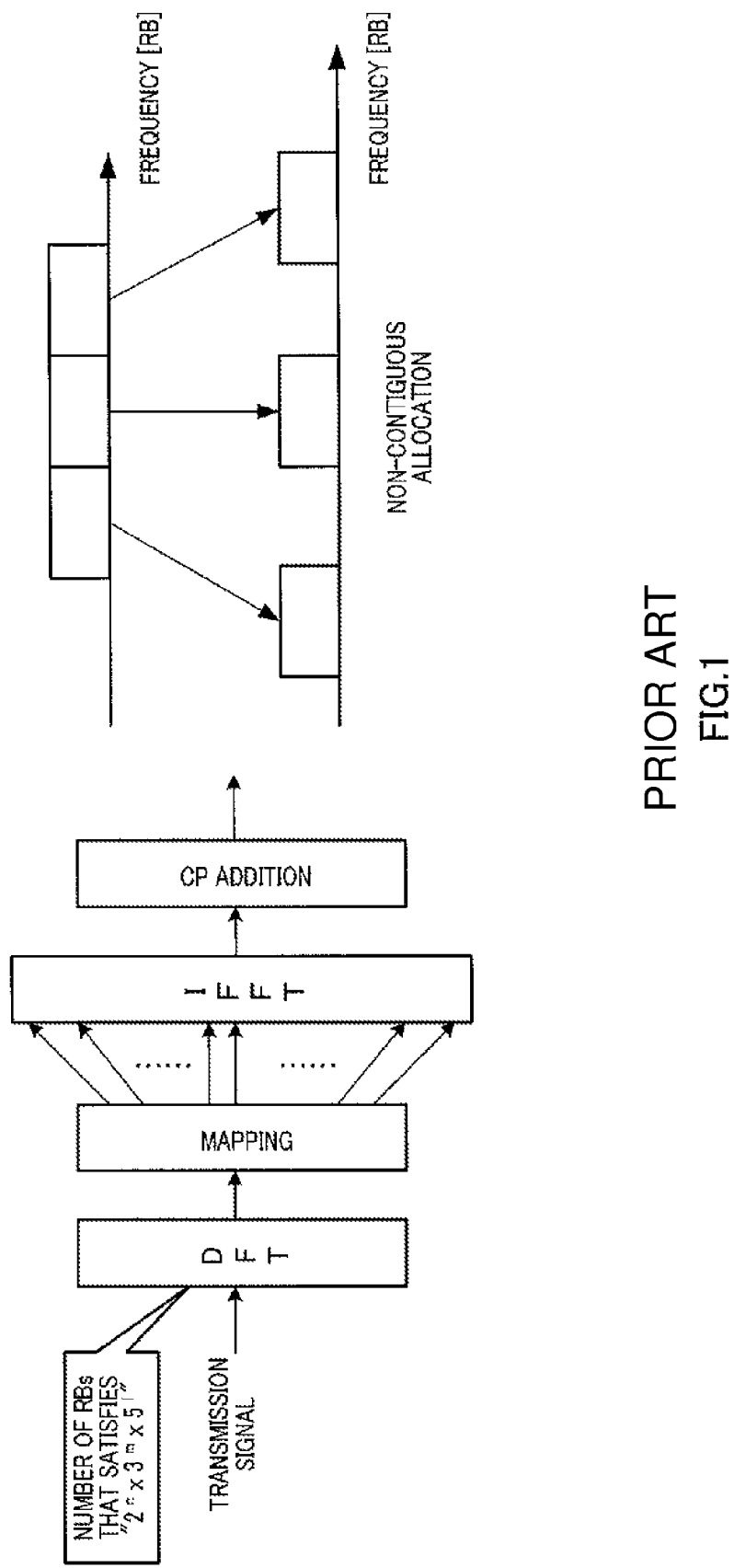
FIG. 1 is a diagram for describing non-contiguous band allocation of a data signal in an LTE-A uplink.
Figure 2:
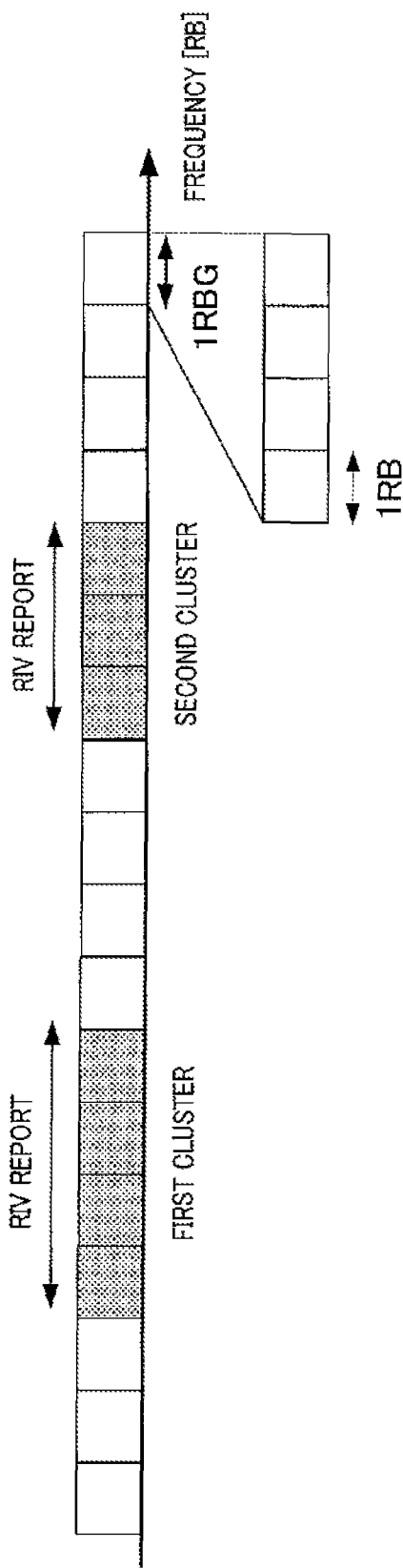
FIG. 2 is a diagram for describing type-2 allocation in an LTE-A downlink.
Figure 4:
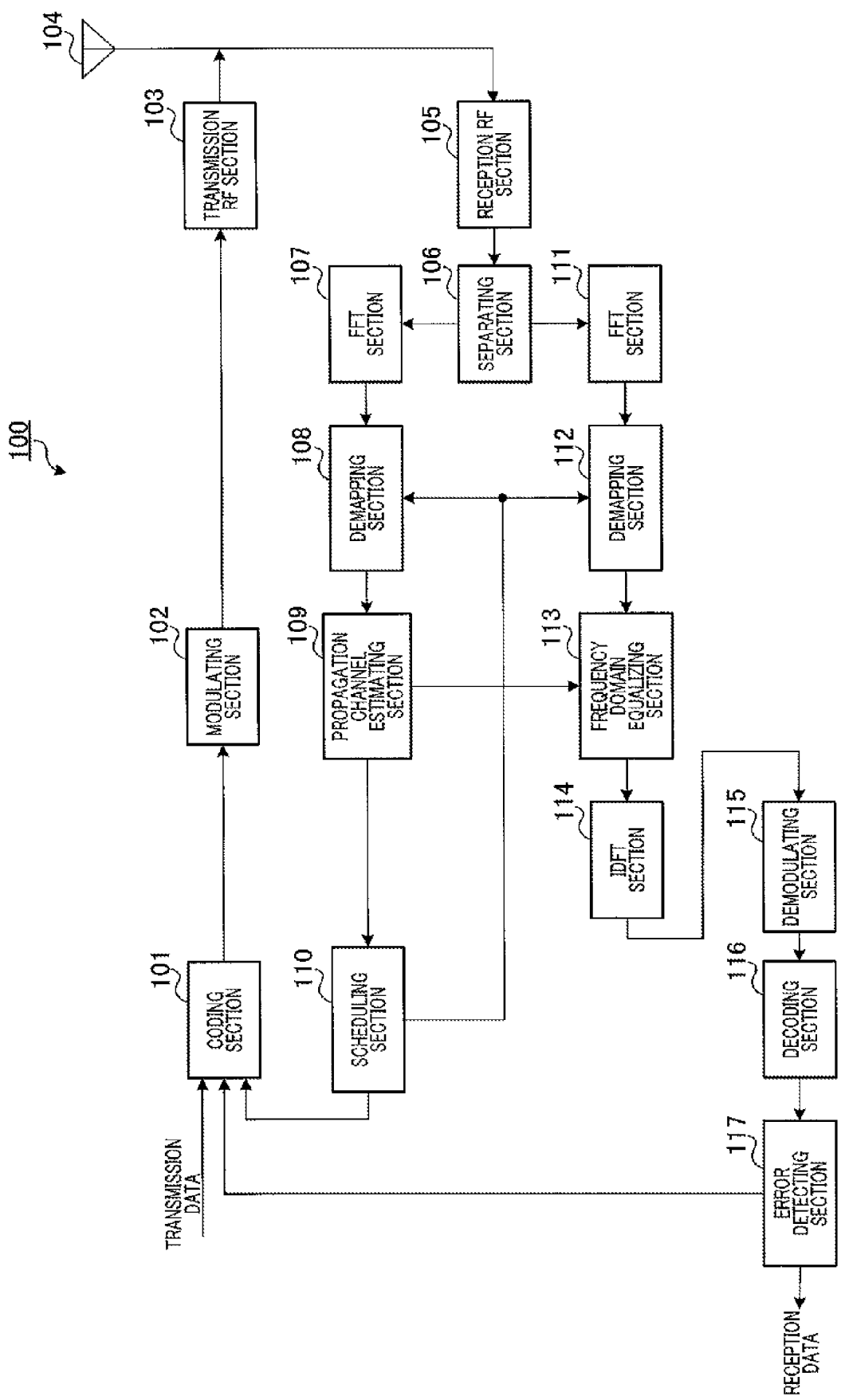
FIG. 4 is a block diagram showing a configuration of a base station according to an embodiment of the present invention.

A configuration of base station apparatus (hereinafter, abbreviated as "base station") 100 according to the embodiment of the present invention is described with reference to FIG. 4.

Coding section 101 receives as input control information such as: transmission data (downlink data); a response signal (an acknowledgment (ACK) signal or a negative acknowledgment (NACK) signal) inputted by error detecting section 117; resource allocation information on each terminal inputted by scheduling section 110; and modulation coding schemes (MCS). Coding section 101 encodes these pieces of input data, and outputs each coded data to modulating section 102.

Modulating section 102 modulates the coded data, and outputs the modulated signal to transmission radio frequency (RE) section 103.

Transmission RE section 103 subjects the modulated signal to transmission processing such as digital to analog (D/A) conversion, up-conversion, and amplification, and wirelessly transmits the signal after the transmission processing to each terminal via antenna 104.

Reception RF section 105 subjects a signal received via antenna 104 to reception processing such as down-conversion and analog to digital (A/D) conversion, and outputs the signal after the reception processing to separating section 106.

Separating section 106 separates the signal inputted by reception RF section 105 into a pilot signal, a data signal, and a control signal. Separating section 106 outputs the pilot signal after the separation to fast Fourier transform (FFT) section 107, and outputs the data signal and the control signal after the separation to FFT section 111.

FFT section 107 subjects the pilot signal inputted by separating section 106 to FFT processing, to thereby convert the signal from a time domain to a frequency domain, and outputs the pilot signal converted into the frequency domain to demapping section 108.

Demapping section 108 extracts, on the basis of the resource allocation information inputted by scheduling section 110, a portion of the frequency-domain pilot signal inputted by FFT section 107, the portion corresponding to a transmission band of each terminal. Then, demapping section 108 outputs each extracted pilot signal to propagation channel estimating section 109.

Propagation channel estimating section 109 estimates an estimation value of frequency fluctuations of a channel (a frequency response of a channel) and an estimation value of reception quality, on the basis of the pilot signal inputted by demapping section 108. Propagation channel estimating section 109 outputs the estimation value of the frequency fluctuations of the channel to frequency domain equalizing section 113, and outputs the estimation value of the reception quality to scheduling section 110.

Scheduling section 110 allocates resource blocks (RBs) to each terminal with the use of the estimation value of the reception quality inputted by propagation channel estimating section 109. Hereinafter, the resource block allocated to each terminal, that is, the resource block that each terminal uses for an actual transmission band is referred to as "allocated resource block (allocated RB)". Note that scheduling section 110 sets the allocated RBs such that the number of allocated RBs is a number that can be expressed by "$2^n \times 3^m \times 5^l$" (n, m, and l are an integer equal to or more than 0). This enables each terminal to perform DFT processing whose number of inputs is "$2^n \times 3^m \times 5^l$", and hence a DFT circuit scale can be reduced. Note that a method of setting allocated RBs by scheduling section 110 will be described later. Scheduling section 110 outputs information on the allocated RBs of each terminal to demapping section 108 and demapping section 112.

In addition, scheduling section 110 generates control information containing resource allocation information indicating the information on the allocated RBs, and outputs the generated control information to coding section 101. Hereinafter, the resource block that is reported by the resource allocation information and is allocated as a transmission band is referred to as "reported resource block (reported RB)". Note that a method of setting reported RBs by scheduling section 110 will be described later. Scheduling section 110 outputs the generated resource allocation information to coding section 101.

FFT section 111 subjects the data signal inputted by separating section 106 to FFT processing, to thereby convert the signal from a time domain to a frequency domain. Then, FFT section 111 outputs the data signal converted into the frequency domain to demapping section 112.

Demapping section 112 extracts, on the basis of the resource allocation information inputted by scheduling section 110, a portion of the data signal inputted by FFT section 111, the portion corresponding to the transmission band of each terminal. Then, demapping section 112 outputs each extracted signal to frequency domain equalizing section 113.

Frequency domain equalizing section 113 subjects the data signal and the control signal inputted by demapping section 112 to equalization processing, with the use of the estimation value of the frequency fluctuations of the channel inputted by propagation channel estimating section 109, and outputs the signal after the equalization processing to IDFT section 114.

IDFT section 114 subjects the data signal inputted by frequency domain equalizing section 113 to IDFT processing, and outputs the signal after the IDFT processing to demodulating section 115.

Demodulating section 115 subjects the signal inputted by IDFT section 114 to demodulation processing, and outputs the signal after the demodulation processing to decoding section 116.

Decoding section 116 subjects the signal inputted by demodulating section 115 to decoding processing, and outputs the signal after the decoding processing (decoded bit sequence) to error detecting section 117.

Error detecting section 117 performs error detection on the decoded bit sequence inputted by decoding section 116 with the use of, for example, cyclic redundancy check (CRC). As a result of the error detection, error detecting section 117 generates the NACK signal as the response signal if the decoded bits have an error, and generates the ACK signal as the response signal if the decoded bits do not have an error. Then, error detecting section 117 outputs the generated response signal to coding section 101. In addition, error detecting section 117 outputs the data signal as reception data if the decoded bits do not have an error. In addition, error detecting section 117 outputs the information such as MCS contained in the control signal to coding section 101.

Figure 5:
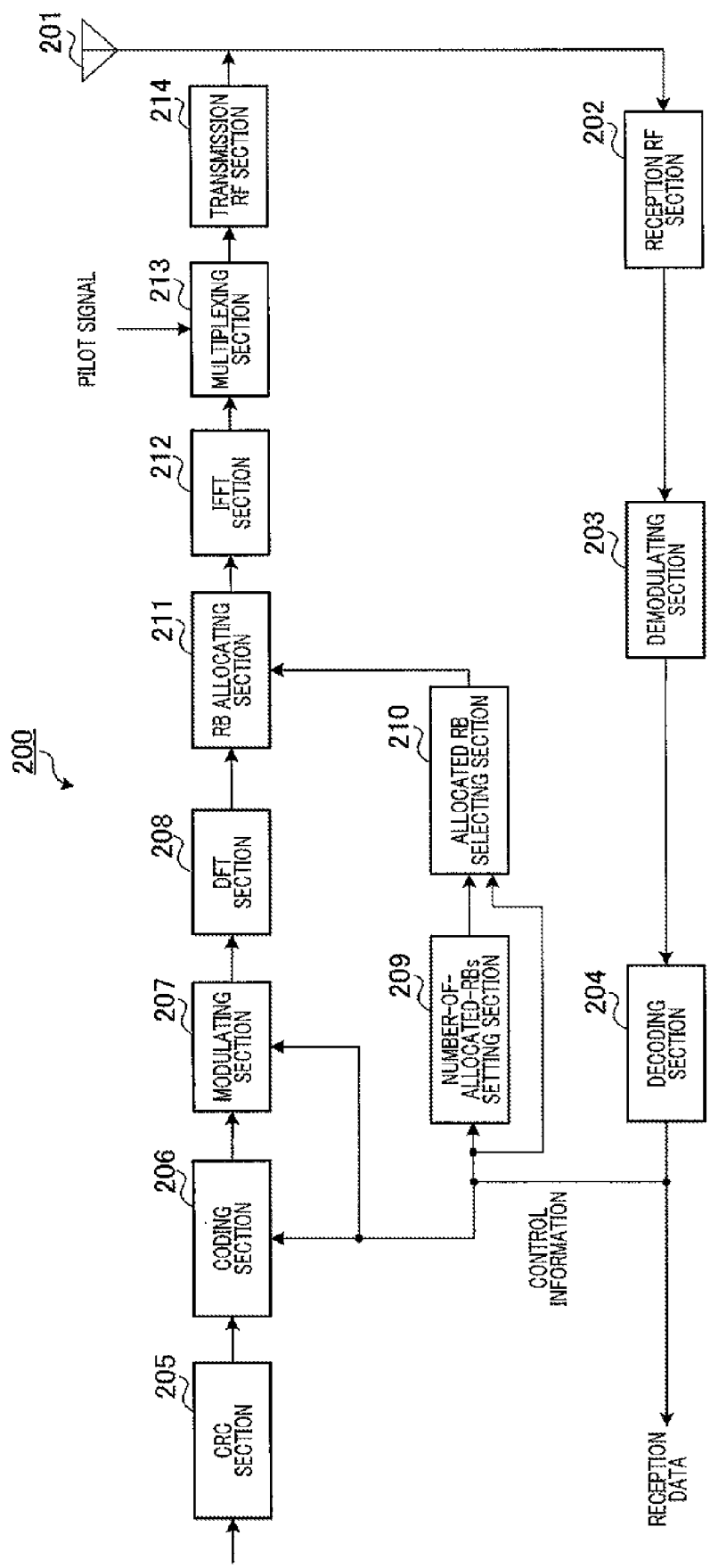
FIG. 5 is a block diagram showing a configuration of a terminal according to the embodiment.

Next, a configuration of terminal 200 according to the embodiment of the present invention is described with reference to FIG. 5.

Reception RF section 202 subjects a signal that is received from the base station via antenna 201, to reception processing such as down-conversion and A/D conversion, and outputs the signal after the reception processing to demodulating section 203.

Demodulating section 203 subjects the signal inputted by reception RF section 202 to equalization processing and demodulation processing, and outputs the signal after the processing to decoding section 204.

Decoding section 204 subjects the signal inputted by demodulating section 203 to decoding processing, and extracts reception data and control information. Here, the control information contains a response signal (an ACK signal or a NACK signal), resource allocation information, MCS information, and the like. Of the pieces of extracted control information, decoding section 204 outputs the resource allocation information to number-of-allocated-RBs setting section 209 and allocated RB selecting section 210, and outputs the MCS information and the like to coding section 206 and modulating section 207.

CRC section 205 receives transmission data, performs CRC coding on the transmission data to generate CRC coded data, and outputs the generated CRC coded data to coding section 206.

Coding section 206 encodes the CRC coded data inputted by CRC section 205 on the basis of the control information inputted by decoding section 204, and outputs the obtained coded data to modulating section 207.

Modulating section 207 modulates the coded data inputted by coding section 206 on the basis of the control information inputted by decoding section 204, and outputs the data signal after the modulation to DFT section 208.

DFT section 208 subjects the data signal inputted by modulating section 207 to DFT processing, and converts the signal from a time domain to a frequency domain. Note that, in the present embodiment, RB allocating section 211 performs the DFT processing assuming that the number of inputs of the data signals inputted by modulating section 207 is "$2^n \times 3^m \times 5^l$", and outputs the resultant signal to RB allocating section 211.

Number-of-allocated-RBs setting section 209 sets the number of RBs used for the actual transmission band (hereinafter, referred to as "number of allocated RBs") on the basis of the resource allocation information inputted by decoding section 204. A method of setting the number of allocated RBs will be described later. Number-of-allocated-RBs setting section 209 outputs information on the set number of allocated RBs to allocated RB selecting section 210.

Allocated RB selecting section 210 selects allocated RBs used for the actual transmission band, on the basis of the resource allocation information inputted by decoding section 204 and the number of allocated RBs inputted by number-of-allocated-RBs setting section 209. A method of selecting allocated RBs will be described later. Allocated RB selecting section 210 outputs information on the selected allocated RBs (allocated RB information) to RB allocating section 211.

RB allocating section 211 allocates the signal after the DFT processing to an RB on the basis of the allocated RB information inputted by allocated RB selecting section 210, and outputs the data signal allocated to the RB to IFFT section 212.

IFFT section 212 subjects the data signal that is allocated to the RB and is outputted by RB allocating section 211, to IFFT processing, and outputs the resultant signal to multiplexing section 213.

Multiplexing section 213 temporally multiplexes a pilot signal and the data signal inputted by IFFT section 212, and outputs the resultant signal to transmission RF section 214.

Transmission RF section 214 subjects the multiplexed signal inputted by multiplexing section 213 to transmission processing such as D/A conversion, up-conversion, and amplification, and wirelessly transmits the signal after the transmission processing to the base station via antenna 201.

Next, description is given of the method of setting the number of allocated RBs by number-of-allocated-RBs setting section 209 and the method of selecting allocated RBs by allocated RB selecting section 210.

A resource allocation method (the conventional method described above) in which a plurality of contiguous bands are reported using a plurality of RIVs is described below as an example. According to the conventional technique, resource is allocated on an RBG basis, and hence the total number of RBs included in an RBG allocated to a transmission band (hereinafter, "number of reported RBs") is multiples of P. Accordingly, in the case where the number of reported RBs is not the number of RBs that can be expressed by "$2^n \times 3^m \times 5^l$", terminal 200 needs to set the number of allocated RBs on the basis of the resource allocation information and select the allocated RBs.

First, description is given of the method of setting the number of allocated RBs by number-of-allocated-RBs setting section 209. In the present embodiment, correspondence tables between the number of reported RBs and the number of allocated RBs are shared by base station 100 and terminal 200.

Correspondence examples between the number of reported RBs and the number of allocated RBs are described below.

In the case where the number of reported RBs is not the number of RBs that can be expressed by "$2^n \times 3^m \times 5^l$", number-of-allocated-RBs setting section 209 sets the number of allocated RBs corresponding to the number of reported RBs, to the number of RBs that can be expressed by any of "$2^n \times 3^m \times 5^l$".

Correspondence Example #1-1

Number-of-allocated-RBs setting section 209 sets, to the number of allocated RBs, the number of RBs that can be expressed by "$2^n \times 3^m \times 5^l$" closest to the number of reported RBs. This enables allocation close to allocation having a degree of division on a P (RB) basis, and hence the frequency scheduling effect can be enhanced.

FIG. 6 shows a correspondence table between the number of reported RBs and the number of allocated RBs according to [Correspondence Example #1-1]. For example, the following case is discussed. That is, in two contiguous bands (clusters), the first cluster includes 12 RBs, and the second cluster includes 16 RBs. Note that the second cluster of the two clusters exists on the higher-frequency side. In this case, according to [Correspondence Example #1-1], among the numbers of RBs that can be expressed by "$2^n \times 3^m \times 5^l$", "27" closest to the sum "28" of the numbers of reported RBs of the two clusters is set as the number of allocated RBs. It will be described later that to which of the first cluster and the second cluster an RB of the reported RBs that is not used for the actual transmission band (hereinafter, referred to as "unused RB") or an RB that is added to the reported RBs as the actual transmission band (hereinafter, referred to as "added RB") is distributed.

Correspondence Example #1-2

Number-of-allocated-RBs setting section 209 sets, as the number of allocated RBs, the smallest number of RBs of the numbers of RBs expressed by "$2^n \times 3^m \times 5^l$" that is larger than the number of reported RBs. This makes resource allocation processing to be described later relatively easy. In addition, the bandwidth of each cluster is larger, and hence channel estimation accuracy can be improved.

FIG. 7 shows a correspondence table between the number of reported RBs and the number of allocated RBs according to [Correspondence Example #1-2]. For example, the following case is discussed. That is, in two contiguous bands (clusters), the first cluster includes 12 RBs, and the second cluster includes 16 RBs. In this case, according to [Correspondence Example #1-2], the smallest number "30" of the numbers of RBs that can be expressed by "$2^n \times 3^m \times 5^l$" larger than the number of reported RBs is set as the number of allocated RBs. It will be described later that to which of the first cluster and the second cluster an added RB is distributed.

Correspondence Example #1-3

Number-of-allocated-RBs setting section 209 sets, as the number of allocated RBs, the largest number of RBs of the numbers of RBs that are expressed by "$2^n \times 3^m \times 5^l$" smaller than the number of reported RBs. This makes the resource allocation processing to be described later relatively easy. In addition, unless the same RBG is allocated to a plurality of terminals during resource allocation, the same RB is not shared by the terminals, and hence frequency scheduling is facilitated.

FIG. 8 shows a correspondence table between the number of reported RBs and the number of allocated RBs according to [Correspondence Example #1-3]. For example, the following case is discussed. That is, in two contiguous bands (clusters), the first cluster includes 12 RBs, and the second cluster includes 16 RBs. In this case, according to [Correspondence Example #1-3], the largest number "27" of the numbers of RBs that are expressed by "$2^n \times 3^m \times 5^l$" smaller than the number of reported RBs is set as the number of allocated RBs. It will be described that to which of the first cluster and the second cluster an unused RB is distributed.

Correspondence Example #1-4

Number-of-allocated-RBs setting section 209 makes switching between [Correspondence Example #1-2] and [Correspondence Example #1-3] in accordance with the number of reported RBs or signaling.

FIG. 9 shows a correspondence table between the number of reported RBs and the number of allocated RBs when switching between [Correspondence Example #1-2] and [Correspondence Example #1-3] is made in accordance with the number of reported RBs. According to [Correspondence Example #1-4] shown in FIG. 9, in the case where the numbers of reported RBs "28", "44", "68", "88", "92", "104", "112", and "116" are reported as the resource allocation information, number-of-allocated-RBs setting section 209 sets, as the number of allocated RBs, the smallest number of RBs of the numbers of RBs that are expressed by "$2^n \times 3^m \times 5^l$" larger than the number of reported RBs, according to [Correspondence Example #1-2]. On the other hand, in the case where the numbers of reported RBs "52", "56", "76", and "84" are reported as the resource allocation information, number-of-allocated-RBs setting section 209 sets, as the number of allocated RBs, the largest number of RBs of the numbers of RBs that are expressed by "$2^n \times 3^m \times 5^l$" smaller than the number of reported RBs, according to [Correspondence Example #1-3]. As a result, according to [Correspondence Example #1-4] of FIG. 9, "50" and "81" can also be selected in addition to the numbers of RBs that can be selected as the number of allocated RBs in [Correspondence Example #1-2] of FIG. 7. In this way, switching between [Correspondence Example #1-2] and [Correspondence Example #1-3] is made in accordance with the number of reported RBs, whereby the numbers of RBs that can be selected as the number of allocated RBs can be increased. Hence, the flexibility of resource allocation can be enhanced. Note that, for example, switching between FIG. 7 and FIG. 8 may be made such that the number of allocated RBs is less likely to be the same as the previous and next numbers of allocated RBs.

Alternatively, number-of-allocated-RBs setting section 209 may make switching between [Correspondence Example #1-2] and [Correspondence Example #1-3] in accordance with, for example, the signaling such as a switching order signal (for example, 1 bit indicating [Correspondence Example #1-2] of FIG. 7 or [Correspondence Example #1-3] of FIG. 8) that is contained in the control information reported by base station 100.

Correspondence Example #1-5

In the case where the number of reported RBs is not the number of RBs that can be expressed by "$2^n \times 3^m \times 5^l$" number-of-allocated-RBs setting section 209 sets, as the number of allocated RBs, the largest "$2^n \times 3^m \times 5^l$" of the numbers of RBs whose remainder of the division of the number of unused RBs by the RBG size (P) is not one half of the RBG size P (RB), the numbers of RBs being smaller than the number of reported RBs. That is, a condition of "the numbers of RBs whose remainder of the division of the number of unused RBs by the RBG size (P) is not one half of the RBG size P (RB)" is further added to [Correspondence Example #1-3]. In addition, [Correspondence Example #1-5] is based on the assumption that the RBG size (P) is an even number.

FIG. 10 shows a correspondence table among the number of reported RBs, the number of allocated RBs, and the number of unused RBs when the above-mentioned condition is added to [Correspondence Example #1-3] shown in FIG. 8. Note that, in FIG. 10, "-k" (k=1, 2) means that the number of unused RBs is k. In addition, in FIG. 10, numerical values in parentheses each show the number of allocated RBs or the number of unused RBs before the above-mentioned condition is added.

As shown in FIG. 10, as a result of the addition of the above-mentioned condition, only the numbers of RBs whose remainder of the division of the number of unused RBs by the RBG size (P) is not one half of the RBG size P (RB) are set as the number of allocated RBs. For example, in the case where the RBG size (P) has 4 RBs, a pair of allocated RBs, in which the number of unused RBs that are not used for the actual transmission band is two, does not exist in the reported RBs. This enables the numbers of unused RBs in the first cluster and the second cluster to be arranged in one RBG. As a result, even in the case where different terminals each cause allocated RB selecting section 210 (to be described later) to select an unused RB in accordance with the number of reported RBs and the number of allocated RBs on the basis of the same rule, contiguous available resource can be secured.

In addition, in the case where the number of reported RBs is not the number of RBs that can be expressed by "$2^n \times 3^m \times 5^l$", number-of-allocated-RBs setting section 209 may set, as the number of allocated RBs, the smallest "$2^n \times 3^m \times 5^l$" of the numbers of RBs whose remainder of the division of the number of added RBs by the RBG size (P) is not one half of the RBG size P (RB), the numbers of RBs being larger than the number of reported RBs. That is, a condition of "the numbers of RBs whose remainder of the division of the number of added RBs by the RBG size (P) is not one half of the RBG size P (RB)" is further added to [Correspondence Example #1-2].

FIG. 11 shows a correspondence table among the number of reported RBs, the number of allocated RBs, and the number of added RBs when the above-mentioned condition is added to [Correspondence Example #1-2] shown in FIG. 7. Note that, in FIG. 11, "+k" (k=1, 2) means that the number of added RBs is k. In addition, in FIG. 11, numerical values in parentheses each show the number of allocated RBs or the number of added RBs before the above-mentioned condition is added.

As shown in FIG. 11, as a result of the addition of the above-mentioned condition, only the numbers of RBs whose remainder of the division of the number of added RBs by the RBG size (P) is not one half of the RBG size P (RB) are set as the number of allocated RBs. As a result, different terminals can each cause allocated RB selecting section 210 (to be described later) to select an unused RB in accordance with the number of reported RBs and the number of allocated RBs on the basis of the same rule.

In addition, in the case where the number of reported RBs is not the number of RBs that can be expressed by "$2^n \times 3^m \times 5^l$", number-of-allocated-RBs setting section 209 sets, as the number of allocated RBs, "$2^n \times 3^m \times 5^l$" closest to the number of reported RBs of the numbers of RBs whose remainder of the division of the number of unused RBs or the number of added RBs by the RBG size (P) is not one half of the RBG size P (RB). That is, a condition of "the numbers of RBs whose remainder of the division of the number of unused RBs or the number of added RBs by the RBG size (P) is not one half of the RBG size P (RB)" is further added to [Correspondence Example #1-1].

FIG. 12 shows a correspondence table among the number of reported RBs, the number of allocated RBs, and the number of unused RBs (or the number of added RBs) when the above-mentioned condition is added to [Correspondence Example #1-1] shown in FIG. 6. Note that, in FIG. 12, "+k" (k=1, 2) means that the number of added RBs is k, and "−k" means that the number of unused RBs is k. In addition, in FIG. 12, numerical values in parentheses each show the number of allocated RBs or the number of unused RBs (or the number of added RBs) before the above-mentioned condition is added.

As shown in FIG. 12, as a result of the addition of the above-mentioned condition, only the numbers of RBs whose remainder of the division of the number of unused RBs or the number of added RBs by the RBG size (P) is not one half of the RBG size P (RB) are set as the number of allocated RBs. As a result, different terminals can each cause allocated RB selecting section 210 (to be described later) to select an unused RB in accordance with the number of reported RBs and the number of allocated RBs on the basis of the same rule.

Hereinabove, description is given of the method of setting the number of allocated RBs by number-of-allocated-RBs setting section 209.

Next, description is given of the method of selecting allocated RBs by allocated RB selecting section 210.

Allocated RB selecting section 210 selects RBs (allocated RBs) used for the actual transmission band in accordance with the number of reported RBs and the number of allocated RBs. Specifically, in the case where the number of reported RBs is larger than the number of allocated RBs, allocated RB selecting section 210 selects, from the reported RBs, a RB that is not used for the actual transmission band (unused RB), and sets, as the allocated RBs, the RBs of the reported RBs other than the unused RB. On the other hand, in the case where the number of reported RBs is smaller than the number of allocated RBs, allocated RB selecting section 210 sets the reported RBs as the allocated RBs, and selects an RB to be added as the allocated RB (added RB).

At this time, if the allocated RB or the unused RB is reported using signaling, signaling overhead increases. Accordingly, a method of selecting an added RB or an unused RB, which is derived from information reported by base station 100 (for example, reported RBs), is fixed up between allocated RB selecting section 210 of terminal 200 and scheduling section 110 of base station 100. Terminal 200 determines the allocated RBs that are allocated by scheduling section 110, on the basis of the information reported by the base station (for example, reported RBs) and the above-mentioned selecting method. This eliminates the need to report the method of selecting an added RB or an unused RB using signaling, and can thereby reduce the signaling overhead. The above-mentioned method of selecting is described below in detail.

Selection Example #1-1

Allocated RB selecting section 210 determines a position to which an unused RB or an added RB is distributed in a cluster designated by reported RBs, in accordance with the information reported by base station 100 (the information indicating the low-frequency side or the high-frequency side of the cluster). Hereinafter, the cluster to which the unused RB or the added RB is distributed is referred to as adjustment cluster. For example, a cluster on the low-frequency side or a cluster on the high-frequency side of the plurality of clusters is determined in advance as the adjustment cluster. Note that which cluster is defined as the adjustment cluster may be changed in accordance with information specific to each terminal (for example, a user ID). Alternatively, which cluster is defined as the adjustment cluster may be reported using signaling.

Specifically, allocated RB selecting section 210 sets, as the unused RBs, RBs corresponding to (the number of reported RBs−the number of allocated RBs) in order from the RB on the low-frequency side (or on the high-frequency side) of the adjustment cluster, on the basis of the information indicating the low-frequency side or the high-frequency side of the cluster. As a result, each terminal can change the position to which the unused RB or the added RB is distributed, to the low-frequency side or the high-frequency side of the cluster. Hence, in the case where the use of a plurality of terminals is assumed, the unused RBs or the added RBs of the terminals are more likely to fall within one RBG. For example, in the circumstance where an adjustment cluster of a terminal #2 exists on the lower-frequency side than an adjustment cluster of a terminal #1, it is assumed that the terminal #2 has an unused RB or an added RB on the high-frequency side of the adjustment cluster while the terminal #1 has an unused RB or an added RB on the low-frequency side of the adjustment cluster. In this case, even if these unused RBs or added RBs are allocated to the same RBG, these unused RBs or added RBs can fall within one RBG without interfering with each other. In addition, even in the case of signaling the information indicating the low-frequency side or the high-frequency side of the cluster, the signaling overhead can be reduced compared with the case of reporting to which position the unused RB or the added RB is distributed.

Note that allocated RB selecting section 210 may select, as the unused RB, an RB on the high-frequency side of a cluster on the high-frequency side or an RB on the low-frequency side of a cluster on the low-frequency side, of at least one of the clusters included in the reported RBs. As a result, the unused RBs that are not used for the transmission band can be secured at an end of the high-frequency side (or the low-frequency side) in a contiguous manner, and hence a terminal of another station having a wider transmission bandwidth can be arranged more easily. Alternatively, allocated RB selecting section 210 may select, among the reported RBs, unused RBs from both the RBs on the high-frequency side and the RBs on the low-frequency side, and may set, as the unused RBs, RBs calculated by subtracting the number of allocated RBs from the number of reported RBs.

Selection Example #1-2

Allocated RB selecting section 210 determines a position to which an unused RB or an added RB is distributed in a cluster designated by reported RBs, in accordance with the number of unused RBs or the number of added RBs that is obtained by a relation between the information reported by base station 100 (the number of reported RBs) and the number of allocated RBs. Hereinafter, the cluster to which the unused RB or the added RB is distributed is referred to as adjustment cluster. For example, a cluster on the low-frequency side or a cluster on the high-frequency side of the plurality of clusters is determined in advance as the adjustment cluster. Note that which cluster is defined as the adjustment cluster may be changed in accordance with information specific to each terminal (for example, a user ID). Alternatively, which cluster is defined as the adjustment cluster may be reported using signaling.

Allocated RB selecting section 210 determines whether the unused RB or the added RB is set from the RBs on the low-frequency side of the adjustment cluster or is set from the RBs on the high-frequency side thereof, in accordance with the number of unused RBs or the number of added RBs. For example, in the case where the number of unused RBs is 1 or 2, allocated RB selecting section 210 sets the unused RB or the added RB onto the high-frequency side of the adjustment cluster. In the case where the number of unused RBs is 3, allocated RB selecting section 210 sets the unused RB or the added RB onto the low-frequency side of the adjustment cluster. As a result, in the case where the use of a plurality of terminals is assumed, the unused RBs or the added RBs of the terminals are more likely to fall within one RBG. For example, in the circumstance where the adjustment cluster of the terminal #2 exists on the lower-frequency side than the adjustment cluster of the terminal #1, it is assumed that the terminal #2 has an unused RB or an added RB on the high-frequency side of the adjustment cluster while the terminal #1 has an unused RB or an added RB on the low-frequency side of the adjustment cluster. In this case, even if these unused RBs or added RBs are allocated to the same RBG, these unused RBs or added RBs can fall within one RBG without interfering with each other. In addition, to which position in the adjustment duster the unused RB or the added RB is distributed does not need to be reported, and hence the signaling overhead can be reduced.

Figure 13:
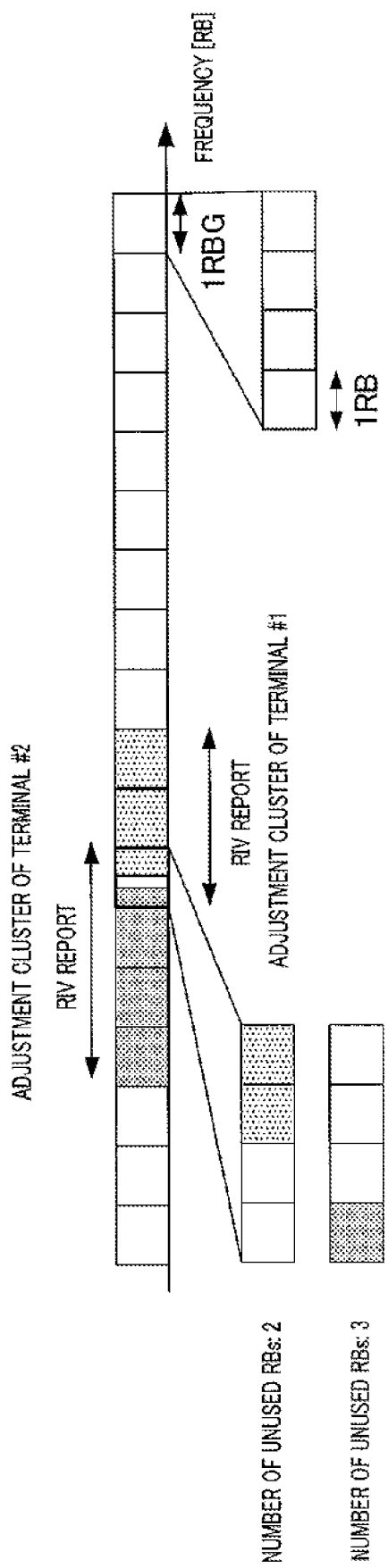
FIG. 13 is a diagram showing [Selection Example #1-2] of the allocated RBs.

With reference to FIG. 13, description is given of the state where the plurality of terminals fall within one RBG. In FIG. 13, in the case as the terminal #1 where the number of unused RBs is 1 or 2, allocated RB selecting section 210 sets unused RBs in order from the low-frequency side of the adjustment cluster of the terminal #1. In addition, in the case as the terminal #2 where the number of unused RBs is 3, allocated RB selecting section 210 sets unused RBs in order from the high-frequency side of the adjustment cluster of the terminal #2. As a result, the unused RBs of one terminal are set onto the high-frequency side, and the unused RBs of another terminal are set onto the low-frequency side. Hence, the unused RBs or the added RBs of the plurality of terminals (the terminals of non-contiguous band allocation) can be allocated to the RBG including the unused RBs.

Selection Example #1-3

Allocated RB selecting section 210 determines whether an adjustment cluster including an unused RB or an added RB is set in a cluster on the low-frequency side or is set in a cluster on the high-frequency side, in accordance with the number of unused RBs or the number of added RBs that is obtained by a relation between the information reported by base station 100 (the number of reported RBs) and the number of allocated RBs. For example, in the case where the number of unused RBs is 1 or 2, allocated RB selecting section 210 sets the cluster on the low-frequency side to the adjustment cluster. In the case where the number of unused RBs is 3, allocated RB selecting section 210 sets the cluster on the high-frequency side to the adjustment cluster. Note that, when Selection Example #1-2 is combined with Selection Example #1-1, in the case where the number of unused RBs is or 2, the unused RB or the added RB can be set onto the high-frequency side of the cluster on the low-frequency side. Further, in the case where the number of unused RBs is 3, the unused RB or the added RB can be set onto the low-frequency side of the cluster on the high-frequency side. As a result, for the cluster on the low-frequency side of the terminal #1 and the cluster on the high-frequency side of the terminal #2 that are highly likely to overlap with each other, RBs overlapped with each other are to be unused RBs or added RBs, and hence the possibility that the unused RBs or the added RBs fall within one RBG can be further enhanced. Alternatively, the following definition may be made in advance. That is, in the case of using the cluster on the low-frequency side, the unused RB or the added RB is set onto the high-frequency side of the cluster, and in the case of using the cluster on the high-frequency side, the unused RB or the added RB is set onto the low-frequency side of the cluster.

In addition, description is given below of a selection example for the unused RB or the added RB when the sum of the numbers of unused RBs of the plurality of terminals is the RBG size (P) (or a multiple of the RBG size (P)).

In such a combination that the sum of the numbers of unused RBs of different terminals is the RBG size (P) (or a multiple of the RBG size (P)), allocated RB selecting section 210 sets the unused RBs in the combination to the cluster on the low-frequency side, and sets the other unused RBs in the combination to the cluster on the high-frequency side.

Figure 14:
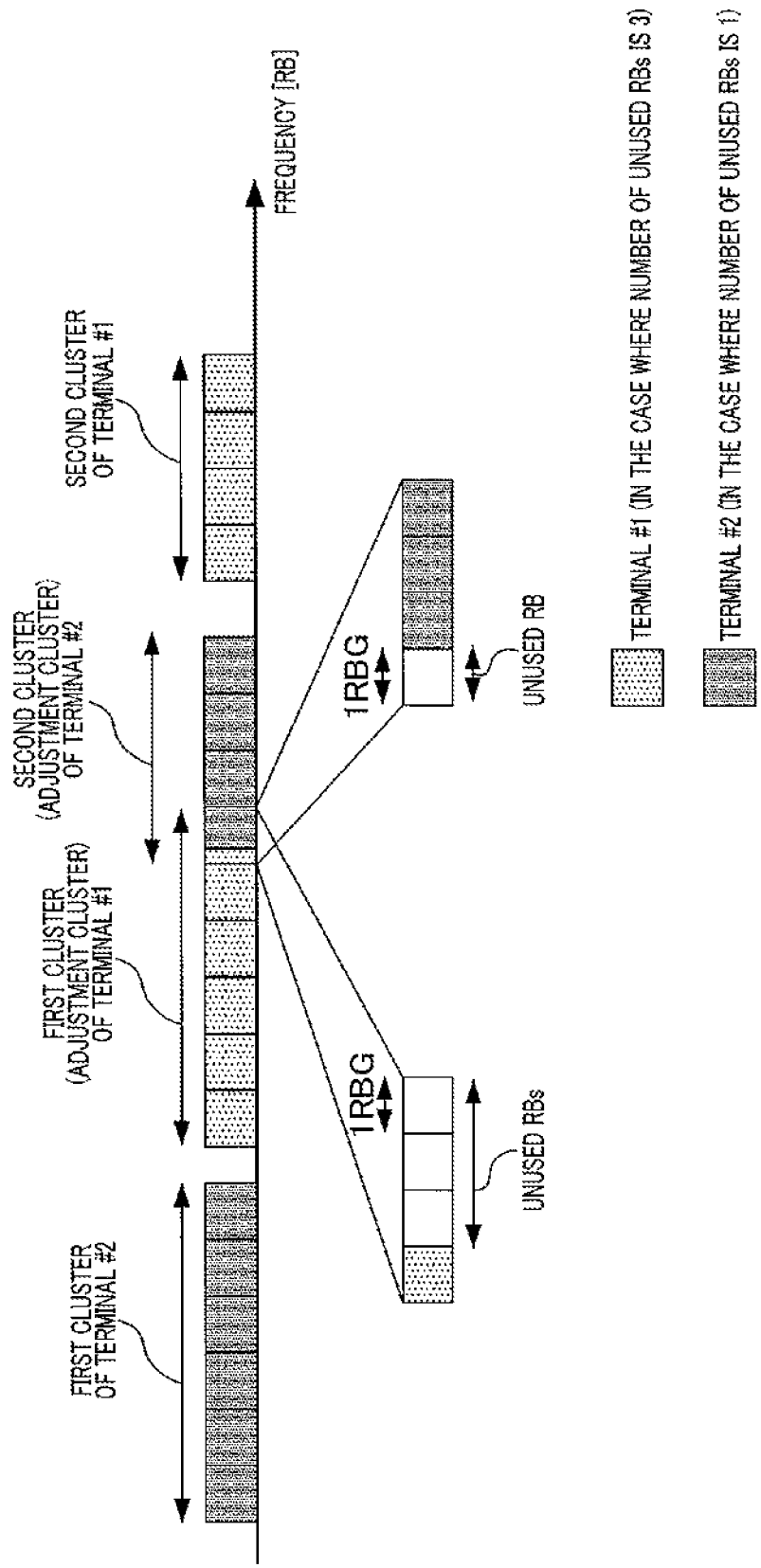
FIG. 14 is a diagram showing [Selection Example #1-3] of the allocated RBs.

For example, in the case where the number of unused RBs of the terminal #1 is 1 and where the number of unused RBs of the terminal #2 is 3 (P is assumed as 4 RBs), the terminal #1 having 3 unused RBs defines the cluster on the low-frequency side as the adjustment cluster, and sets the unused RBs onto the high-frequency side of this adjustment cluster. Then, the terminal #2 having 1 unused RB defines the cluster on the high-frequency side as the adjustment cluster, and sets the unused RB onto the low-frequency side of this adjustment cluster (see FIG. 14). Here, in the case where the terminal #1 has 3 unused RBs and where the terminal #2 has 1 unused RB, the unused RBs of the terminal #1 and the unused RB of the terminal #2 can be allocated as resource within one RBG without an empty RB.

Note that the above description is given assuming such a combination that the sum of the numbers of unused RBs of the terminal #1 and the terminal #2 is the RBG size (P) (or a multiple of the RBG size (P)), but [Selection Example #1-2] can be similarly applied to the case where the sum of the numbers of unused RBs of the terminal #1 and the terminal #2 is equal to or less than the RBG size (P). For example, in the case where the number of unused RBs is 1, the cluster on the high-frequency side is defined as the adjustment cluster, and the unused RB is set onto the low-frequency side of this adjustment cluster. In the case where the number of unused RBs is 2, the cluster on the low-frequency side is defined as the adjustment cluster, and the unused RBs are set onto the high-frequency side of this adjustment cluster. As a result, the unused RBs of the terminal #1 and the terminal #2 can be allocated as resource within one RBG without an empty RB, and hence the frequency utilization efficiency can be improved.

That is allocated RB selecting section 210 selects the unused RB or the added RB from the high-frequency side of the adjustment cluster on the low-frequency side or the low-frequency side of the adjustment cluster on the high-frequency side, in accordance with the number of unused RBs or the number of added RBs.

Selection Example #1-4

Figure 15:
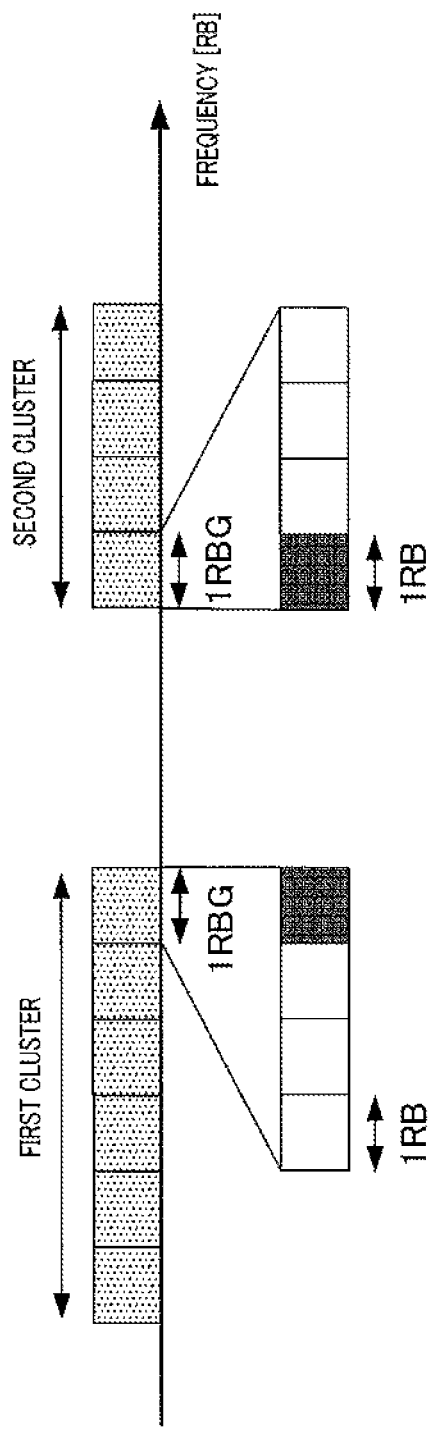
FIG. 15 is a diagram showing another example of [Selection Example #1-4] of the allocated RBs.

In the case where the number of unused RBs or the number of added RBs is equal to or more than 2, allocated RB selecting section 210 selects an unused RB or an added RB from both the high-frequency side of the first cluster and the low-frequency side of the second cluster, and sets the number of allocated RBs to the number of RBs that can be expressed by "$2^n \times 3^m \times 5^l$" (see FIG. 15). Note that the first duster and the second cluster in this case are allocated to the same terminal, and the second cluster exists on the high-frequency side of the first cluster. As a result, contiguous resource can be secured between the first cluster and the second cluster, and part of resource of another terminal can be allocated to the RBG including the unused RBs or the added RBs. Hence, the frequency utilization efficiency can be improved.

Note that the above description is given assuming that the number of clusters is 2, but the present invention can be similarly applied to the case were the number of clusters is equal to or more than 3. For example, when the number of clusters is 3, in the case where the number of unused RBs is 1, the unused RB is set onto the high-frequency side of the first cluster. Further, in the case where the number of unused RBs is 2, the unused RBs are set onto the low-frequency side of the second cluster. Further, in the case where the number of unused RBs is 3, the unused RBs are set in order from the low-frequency side of the third cluster. Note that the first cluster, the second cluster, and the third cluster are arranged in the stated order from the low-frequency side.

That is, in the case where the number of clusters is n, allocated RB selecting section 210 sets the unused RB onto the high-frequency side of the $i^{th}$ cluster (i=1, 2, . . . , n−1 (an integer equal to or more than 2)), and sets the unused RB onto the low-frequency side of the $i+1^{th}$ cluster. Here, the first cluster, the second cluster, . . . , the $n^{th}$ cluster are arranged in the stated order from the low-frequency side. As a result, contiguous resource can be secured between the $i^{th}$ cluster and the $i+1^{th}$ cluster, and part of resource of another terminal can be allocated to the RBG including the unused RBs. Hence, the frequency utilization efficiency can be improved.

Alternatively, for clusters at odd-numbered positions, the unused RB or the added RB may be set onto on the low-frequency side thereof, and for clusters at even-numbered positions, the unused RB or the added RB may be set onto the high-frequency side thereof. As a result, part of a cluster at an odd-numbered position and part of a cluster at an even-numbered position next to the odd-numbered position can be more easily allocated as resource within one RBG.

Note that the base station may report the unused RB or the added RB to each terminal using signaling. For example, the base station designates which RB is defined as the unused RB or the added RB. In addition, the base station may designate, using signaling, an adjustment cluster to which the unused RB or the added RB is distributed, that is, to which cluster the unused RB is distributed or to which cluster the added RB is added. As a result, the base station can set the adjustment cluster to which the unused RB or the added RB is distributed, in accordance with available resource conditions, and hence the frequency utilization efficiency can be improved.

Alternatively, allocated RB selecting section 210 may provide a threshold value X [RB] for the number of unused RBs or the number of added RBs, and may determine the unused RB or the added RB depending on whether or not the number of unused RBs or the number of added RBs is equal to or more than X [RB]. For example, in the case where the number of unused RBs is equal to or more than X [RB], allocated RB selecting section 210 selects the unused RB from the high-frequency side of the first cluster. In the case where the number of unused RBs is less than X [RB], allocated RB selecting section 210 selects the unused RB from the low-frequency side of the second cluster. As a result, a large number of combinations of RBGs including RBs part of which are used by the first cluster of the terminal #1 and the second cluster of the terminal #2 can fall within one RBG. Hence, the frequency utilization efficiency can be enhanced.

Hereinabove, description is given of the method of selecting allocated RBs by allocated RB selecting section 210.

Next, description is given of the method of setting allocated RBs and reported RBs by scheduling section 110. Two methods are conceivable for the method of setting allocated RBs and reported RBs. The two methods are described below in order.

[1]

Scheduling section 110 sets allocated RBs of each terminal with the use of the estimation value of the reception quality inputted by propagation channel estimating section 109. At this time, scheduling section 110 allocates resource on an RBG basis. In the case where the number of RBs as the resource cannot be expressed by "$2^n \times 3^m \times 5^l$" (n, m, and l are an integer equal to or more than 0), scheduling section 110 sets, as the unused RB, part of the RBs in the RBG to which the resource is allocated as a transmission band, or sets, as the added RB, part of the RBs in the RBG to which the resource is not allocated as a transmission band, whereby the number of allocated RBs is set so as to be a number that can be expressed by "$2^n \times 3^m \times 5^l$" (n, m, and l are an integer equal to or more than 0).

In the case where no unused RB or no added RB exists, scheduling section 110 sets the same number as the number of allocated RBs to the number of reported RBs, and generates resource allocation information corresponding to the allocated RBs. On the other hand, in the case where the unused RB or the added RB exists, scheduling section 110 sets the number of reported RBs according to the number of allocated RBs on the basis of the above-mentioned correspondence examples between the number of reported RBs and the number of allocated RBs, and generates resource allocation information corresponding to the allocated RBs. As a result, even in the case of non-contiguous allocation, flexible frequency scheduling is possible without an increase in DFT circuit scale.

[2]

Scheduling section 110 determines the number of RBs to be allocated to each terminal as the number of allocated RBs, from the numbers of RBs that can be selected, with the use of the estimation value of the reception quality inputted by propagation channel estimating section 109.

Then, scheduling section 110 secures resource corresponding to the determined number of allocated RBs on an RBG basis, and generates resource allocation information indicating the secured RBG. After that, the resource blocks included in the secured RBG are reported as the reported RBs to each terminal. Note that scheduling section 110 determines the unused RB or the added RB from the RBG used for the transmission band, on the basis of the above-mentioned correspondence examples between the number of reported RBs and the number of allocated RBs and the above-mentioned selection examples of the allocated RBs. As a result, scheduling section 110 can set the number of allocated RBs to such a number that can be expressed by "$2^n \times 3^m \times 5^l$" (n, m, and l are an integer equal to or more than 0). Hence, even in the case of non-contiguous allocation, flexible frequency scheduling is possible without an increase in DFT circuit scale.

As described above, in the case where the number of reported RBs cannot be expressed by "$2^n \times 3^m \times 5^l$" (n, m, and l are an integer equal to or more than 0), scheduling section 110 sets the number of allocated RBs used for the actual transmission band to the number of resource blocks that can be expressed by any of "$2^n \times 3^m \times 5^l$", the number of allocated RBs corresponding to the number of reported RBs. Then, scheduling section 110 generates information on the RBG corresponding to the allocated RBs, as resource allocation information.

At this time, scheduling section 110 generates, as the resource allocation information, group information corresponding to the resource to which the actual transmission band is allocated, of a plurality of groups obtained by dividing a system band on the basis of a predetermined number of resource blocks. Then, scheduling section 110 selects, from the reported RBs, the unused RB that is not used for the transmission band, or selects the added RB that is added to the reported RBs and is used for the transmission band, on the basis of the resource allocation information and the number of allocated RBs.

As described above, in the present embodiment, in the case where the number of reported RBs reported by the resource allocation information cannot be expressed by "$2^n \times 3^m \times 5^l$" (n, m, and l are an integer equal to or more than 0), number-of-allocated-RBs setting section 209 sets the number of allocated RBs used for the actual transmission band to the number of resource blocks that can be expressed by any of "$2^n \times 3^m \times 5^l$", the number of allocated RBs corresponding to the number of reported RBs. Then, allocated RB selecting section 210 selects, from the reported RBs, the unused RB that is not used for the transmission band, or selects the added RB that is added to the reported RBs and is used for the transmission band, on the basis of the resource allocation information and the number of allocated RBs. As a result, flexible frequency scheduling is possible without an increase in DFT circuit scale.

In addition, in the case where the system band is divided into a plurality of groups on the basis of a predetermined number of resource blocks (on an RBG size (P) or RBG basis) and where the resource is allocated on an RBG basis, the amount of signaling for allocation report can be suppressed by reporting the resource allocation information indicating the RBG to which the resource is allocated. In addition, even in the case where the number of reported RBs is the number of RBs that cannot be expressed by "$2^n \times 3^m \times 5^l$", resource allocation is possible, and hence the frequency scheduling effect can be improved. In addition, the number of RBs that can be expressed by "$2^n \times 3^m \times 5^l$" is used as the number of allocated RBs, and hence an increase in DFT circuit scale can be avoided.

In addition, the above description is given of the case where the number of RBs inputted to the DFT circuit is limited to "$2^n \times 3^m \times 5^l$", but the present invention can be similarly applied to the case where an FFT circuit is used instead of the DFT circuit. In the FFT circuit, the number of RBs inputted to the FFT circuit is limited to "$2^m$", and hence a correspondence table between the number of added RBs and the number of allocated RBs may be set with "$2^n \times 3^m \times 5^l$" being replaced with "$2^m$". Note that the present invention is more preferably applied to the DFT circuit that allows the selection of a larger number of RBs than the FFT circuit in which an input signal is limited to the number of RBs of "$2^m$".

Note that the base station may allocate resource of another terminal to the unused RB, and the terminal may use the unused RB as resource for transmitting control information of its own station or another station.

Note that the above description is given of the case where the base station reports, to each terminal, the resource allocation information indicating the group to which the resource is allocated, of the plurality of groups that are obtained by dividing the system band on the basis of a predetermined number of resource blocks. Alternatively, the present invention may be applied not to the entire system band but part of the system band. That is, assuming that the system band has 100 RBs, the present invention may be applied to both the case where the resource allocation information is generated for 100 RBs and the case where the resource allocation information is generated for 50 RBs.

Note that, in the above description, in the case where the number of reported resource blocks cannot be expressed by "$2^n \times 3^m \times 5^l$", the number of allocated resource blocks used for the actual transmission band is set to the number of resource blocks that can be expressed by any of "$2^n \times 3^m \times 5^l$", the number of allocated resource blocks corresponding to the number of reported resource blocks. Alternatively, in the case where the number of reported resource blocks cannot be expressed by "$2^n \times 3^m \times 5^l$", the number of reported resource blocks may be replaced with another report information for recognition. This can convert meaningless report information into meaningful report information.

Note that the above-mentioned embodiment is described assuming the antenna, but the present invention can be similarly applied to an antenna port.

The antenna port refers to a logical antenna including one or more physical antennas. That is, the antenna port does not necessarily refer to one physical antenna, and may refer to an array antenna including a plurality of antennas.

For example, 3GPP LTE does not define how many physical antennas an antenna port is formed with, but defines that an antenna port is the minimum unit that a base station can transmit different reference signals.

In addition, the antenna port may be defined as the minimum unit for multiplication of weighting of a precoding vector.

In addition, in the above-mentioned embodiment, description is given of an example case where the present invention is configured in the form of hardware, but the present invention can be implemented in the form of software.

In addition, the respective functional blocks used in the above-mentioned embodiment are implemented typically as LSI as an integrated circuit. These functional blocks may be individually implemented on a chip, or may be partially or wholly implemented on a chip. The term LSI is used here, but the term IC, system LSI, super LSI, or ultra LSI may be suitably used depending on the degree of integration.

In addition, a technique of making an integrated circuit is not limited to LSI, and such integration may be implemented using a dedicated circuit or a general-purpose processor. It is also possible to utilize: a field programmable gate array (FPGA) that can be programmed after LSI production; and a reconfigurable processor in which connection and settings of circuit cells inside of LSI can be reconfigured.

Moreover, if a technique of making an integrated circuit that can replace LSI appears along with progress in semiconductor technology or other related technology, as a matter of course, the functional blocks may be integrated using the technique. For example, application of biotechnology is possible.

INDUSTRIAL APPLICABILITY

The present invention is suitable for use in a wireless communication apparatus and a wireless communication method for a wireless communication system that allocates a data signal to a non-contiguous band.

REFERENCE SIGNS LIST

100 Base station
101, 206 Coding section
102, 207 Modulating section
103, 214 Transmission RF section
104, 201 Antenna
105, 202 Reception RF section
106 Separating section
107, 111 FFT section
108, 112 Demapping section
109 Propagation channel estimating section
110 Scheduling section 113 Frequency domain equalizing section
114 IDFT section
115, 203 Demodulating section
116, 204 Decoding section
117 Error detecting section
200 Terminal
205 CRC section
208 DFT section
209 Number-of-allocated-RBs setting section
210 Allocated RB selecting section
211 RB allocating section
212 IFFT section
213 Multiplexing section

The invention claimed is:

1. A wireless communication apparatus comprising:
a receiver configured to receive resource allocation information indicating a group to which resource is allocated, out of a plurality of groups that are obtained by dividing a system band based on a unit of a determined number of resource blocks;
a setting section configured to set, in a case where a number of reported resource blocks reported by the resource allocation information cannot be expressed by "$2^n \times 3^m \times 5^l$" (n, m, and l are an integer equal to or more than 0), a number of allocated resource blocks that is used for an actual transmission band and corresponds to the number of reported resource blocks, to a number of resource blocks that can be expressed by any of "$2^n \times 3^m \times 5^l$"; and
a selector configured to select an unused resource block that is not used for the transmission band in the reported resource blocks, or select an added resource block that is added to the reported resource blocks and is used for the transmission band, on a basis of the resource allocation information and the number of allocated resource blocks.

2. The wireless communication apparatus according to claim 1, wherein
the setting section sets, as the number of allocated resource blocks, a number of resource blocks that can be expressed by "$2^n \times 3^m \times 5^l$" that is closest to the number of reported resource blocks.

3. The wireless communication apparatus according to claim 1, wherein
the setting section sets a smallest number of resource blocks, as the number of allocated resource blocks, out of numbers of resource blocks that can be expressed by "$2^n \times 3^m \times 5^l$" that is larger than the number of reported resource blocks.

4. The wireless communication apparatus according to claim 1, wherein
the setting section sets a largest number of resource blocks, as the number of allocated resource blocks, out of numbers of resource blocks that can be expressed by "$2^n \times 3^m \times 5^l$" that is smaller than the number of reported resource blocks.

5. The wireless communication apparatus according to claim 1, wherein
the setting section sets a largest "$2^n \times 3^m \times 5^l$", as the number of allocated resource blocks, out of numbers of resource blocks whose remainder when a number of the unused resource blocks divided by the unit of the determined number of resource blocks is not one half of the unit of the determined number of resource blocks, the numbers of resource blocks being smaller than the number of reported resource blocks.

6. The wireless communication apparatus according to claim 1, wherein
the setting section sets a smallest "$2^n \times 3^m \times 5^l$", as the number of allocated resource blocks, out of numbers of resource blocks whose remainder when a number of the added resource blocks divided by the unit of the determined number of resource blocks is not one half of the unit of the determined number of resource blocks, the numbers of resource blocks being larger than the number of reported resource blocks.

7. The wireless communication apparatus according to claim 1, wherein
the setting section sets "$2^n \times 3^m \times 5^l$" closest to the number of reported resource blocks, as the number of allocated resource blocks, out of numbers of resource blocks whose remainder when a number of the unused resource blocks or a number of the added resource blocks divided by the unit of the determined number of resource blocks is not one half of the unit of the determined number of resource blocks.

8. The wireless communication apparatus according to claim 1, wherein
the selector selects, out of at least one of clusters included in the reported resource blocks, a resource block on a high-frequency side in a high-frequency side cluster or a resource block on a low-frequency side in a low-frequency side cluster, as the unused resource block.

9. The wireless communication apparatus according to claim 1, wherein
the selector determines, as an adjustment cluster, a cluster including the unused resource block or the added resource block out of clusters included in the reported resource blocks, in accordance with a number of the unused resource blocks or a number of the added resource blocks, and selects, as the unused resource block, a resource block on a high-frequency side or a low-frequency side in the adjustment cluster.

10. The wireless communication apparatus according to claim 9, wherein
the selector selects the unused resource block or the added resource block out of the high-frequency side in the adjustment cluster on a low-frequency side or the low-frequency side in the adjustment cluster on a high-frequency side, in accordance with the number of unused resource blocks or the number of added resource blocks.

11. The wireless communication apparatus according to claim 1, wherein
the selector selects the unused resource blocks or the added resource blocks, in a case where a number of the unused resource blocks or a number of the added resource blocks is 2 or more, out of both a high-frequency side in a first cluster allocated to the same terminal and a low-frequency side in a second cluster existing on the high-frequency side of the first cluster.

12. A wireless communication apparatus comprising:
a scheduler configured to:
set a number of allocated resource blocks allocated to an actual transmission band, to a number of resource blocks that can be expressed by any of "$2^n \times 3^m \times 5^l$" (n, m, and l are an integer equal to or more than 0);
generate, as resource allocation information, group information corresponding to a resource to which the actual transmission band is allocated, out of a plurality of groups that are obtained by dividing a system band based on a unit of a determined number of resource blocks;
select an unused resource block that is not used for the transmission band in reported resource blocks, or select an added resource block that is added to the reported resource blocks and is used for the transmission band, on a basis of the resource allocation information and the number of allocated resource blocks; and a transmitter configured to transmit the resource allocation information.

13. A wireless communication method comprising;

receiving resource allocation information indicating a group to which resource is allocated, out of a plurality of groups that are obtained by dividing a system band based on a unit of a determined number of resource blocks;

setting, in a case where a number of reported resource blocks reported by the resource allocation information cannot be expressed by "$2^n \times 3^m \times 5^l$" (n, m, and l are an integer equal to or more than 0), a number of allocated resource blocks that is used for an actual transmission band and corresponds to the number of reported resource blocks, to a number of resource blocks that can be expressed by any of "$2^n \times 3^m \times 5^l$"; and selecting an unused resource block that is not used for the transmission band in the reported resource blocks, or selecting an added resource block that is added to the reported resource blocks and is used for the transmission band, on a basis of the resource allocation information and the number of allocated resource blocks.

14. A wireless communication method comprising:

setting a number of allocated resource blocks allocated to an actual transmission band, as a number of resource blocks that can be expressed by any of "$2^n \times 3^m \times 5^l$" (n, m, and l are an integer equal to or more than 0);

generating, as resource allocation information, group information corresponding to a resource to which the actual transmission band is allocated, out of a plurality of groups that are obtained by dividing a system band based on a unit of a determined number of resource blocks;

selecting an unused resource block that is not used for the transmission band in reported resource blocks, or selecting an added resource block that is added to the reported resource blocks and is used for the transmission band, on a basis of the resource allocation information and the number of allocated resource blocks; and transmitting the resource allocation information.

* * * * *